United States Patent
Stilling

(10) Patent No.: US 7,574,132 B2
(45) Date of Patent: Aug. 11, 2009

(54) METHOD FOR STARTING LASERS IN A NETWORK

(75) Inventor: Bernd Stilling, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 533 days.

(21) Appl. No.: 10/569,143

(22) PCT Filed: Aug. 10, 2004

(86) PCT No.: PCT/EP2004/051757

§ 371 (c)(1),
(2), (4) Date: Feb. 21, 2006

(87) PCT Pub. No.: WO2005/022783

PCT Pub. Date: Mar. 10, 2005

(65) Prior Publication Data

US 2007/0047434 A1 Mar. 1, 2007

(30) Foreign Application Priority Data

Aug. 22, 2003 (DE) ................................. 103 38 744

(51) Int. Cl.
*H04B 10/00* (2006.01)
(52) U.S. Cl. .............................. 398/1; 398/140; 398/151
(58) Field of Classification Search ..................... 398/1, 398/6, 140, 151, 162
See application file for complete search history.

(56) References Cited

U.S. PATENT DOCUMENTS

| 6,626,587 | B1 * | 9/2003 | Marmur ........................ 398/17 |
| 2003/0194233 | A1 * | 10/2003 | Casanova et al. ............... 398/2 |

FOREIGN PATENT DOCUMENTS

| EP | 1 003 300 A2 | 5/2000 |
| EP | 1003300 A2 * | 5/2000 |
| EP | 1 130 805 A1 | 9/2001 |

OTHER PUBLICATIONS

International Telecommunication Union, "ITU-T G.664: Optical Safety Procedures and Requirements for Optical Transport Systems", Mar. 2003, pp. 1-18, XP002307774.

* cited by examiner

*Primary Examiner*—Nathan M Curs
(74) *Attorney, Agent, or Firm*—Laurence A. Greenberg; Werner H. Stemer; Ralph E. Locher

(57) ABSTRACT

A method for starting lasers in a network is provided. According to the method, a restart phase in automatic mode is initiated after the laser is disconnected. During the restart phase in automatic mode, which is accompanied by a delay time for the new laser connection, the automatic mode is switched to a different mode in which the new connection of the laser takes place faster than in automatic mode. This can be achieved by switching to manual mode as per ITU-T G.664. Furthermore, safety measures are defined before activating switching from the network management or a network element control so that safety is ensured during the fast, new connection of the laser.

14 Claims, 3 Drawing Sheets

METHOD FOR STARTING LASERS IN A NETWORK

CROSS REFERENCE TO RELATED APPLICATIONS

This application is the U.S. National Stage of International Application No. PCT/EP2004/051757, filed Aug. 10, 2004 and claims the benefit thereof. The International Application claims the benefits of German application No. 10338744.7 DE filed Aug. 22, 2003, both of the applications are incorporated by reference herein in their entirety.

FIELD OF INVENTION

The invention relates to a method for starting lasers in a network according to the independent claim.

BACKGROUND OF INVENTION

In the event of a fault e.g. in the event of a cable interruption, laser radiation in an optical transport network (OTN), which at a certain intensity can result in damage to eyesight, may be released. ITU-T G.664 "Optical Safety Procedures and Requirements for Optical Transport Systems", June 1999, specifies in respect of SDH (synchronous digital hierarchy) networks and optical point-to-point connections methods for disconnecting lasers or for reducing the laser radiation being released. ITU-T G.664 also specifies methods which enable the connection of the transmission route at the time of startup or after clearing a fault. Laser disconnections are, however, carried out not only in cases of faults but also e.g. where a network is reconfigured.

ITU-T G.664 describes both a manual and an automatic mode for connecting lasers. In the case of the manual method, the laser is connected manually. For safety reasons, the connection duration is only 2 seconds (up to a maximum of 90 seconds in the case of manual tests). If the transmission route is intact, a receiver at one end of a transmission route detects the laser light and then also connects a laser there which feeds the light in the return direction to a transmitter location disposed at the start of the transmission route. The transmission route is thus operational. In the case of the automatic method, the disconnected laser is connected at intervals of 100-300 seconds for a duration of 2 seconds. If the transmission route is intact, the receiver at the end of the transmission route detects light and connects the laser there, which feeds the light in the return direction to a transmitter location disposed at the start of the transmission route. As a result of the pauses between the laser pulses, the startup of the transmission route may in this case be delayed by a maximum of 300 seconds.

In a transparent optical network, optical signals are switched without optical-electrical conversion. For example, a known switching technology is based on the use of MEMS (micro-electrical-mechanical system). This means that where an optical connection between a laser at the transmitter end and a receiver disposed at the end of the transmission route is not switched, the receiver detects no light and consequently, as in the event of a fault, disconnects a laser at the transmitter end by means of radiation in the return direction. In the case of optical connections between transmitter and receiver not being switched, the lasers are thus automatically deactivated. If an optical connection is then established as per automatic mode in accordance with ITU-T G.664, it can take up to a maximum of 300 seconds until the lasers are connected in the case of this automatic method. Such a long delay time cannot be tolerated.

FIG. 1 shows by way of example a network for transmitting optical signals in which the disconnection and connection of lasers could be applied as per the manual and automatic modes in accordance with ITU-T G.664. An optically transparent switching range TS of the network has several transparent network nodes without optical-electrical converters—here four elements ONK1, ONE2, ONK3, ONK4—which are connected to one another by means of optical fibers LWLij (i<j=1, 2, 3, 4) and enable differing transparent switchings of the transmitted optical signals. Outside the transparent switching range, a network node NK1 at the transmitter end, comprising an electrical-optical converter, i.e. comprising a laser source, is connected to the first transparent network node ONK1. A network node NK2 at the receiver end, comprising an electrical-optical converter, is connected to the third transparent network node ONK3. By this means, optical signals, for example, can be transmitted from the network node NK1 at the transmitter end via the transparent network nodes ONK1, ONK3 having an intermediately connected optical fiber LWL 13 to the network node NK2 at the receiver end. A transponder TL2, TL1 at the transmitter end and/or receiver end, comprising laser sources and optical receivers, can now be connected respectively to one of the second and fourth transparent network nodes ONK2, ONK4. If a fault occurs e.g. in the optical fiber LWL 13, in automatic mode for monitoring for laser safety purposes in accordance with ITU-T G.664, the lasers in the network nodes NK1, NK2 and in the transponders TL1, TL2 remain disconnected for several hundred seconds before being reconnected, although a rerouting of the optical signals via optical fibers LWLij other than LWL13, as well as a bar on switching to the faulty optical fiber LWL13, would be possible immediately or in a few seconds.

SUMMARY OF INVENTION

An object of the invention is to specify a method for starting lasers in a network for the transmission of optical signals which, after disconnection of the lasers, enables their rapid reconnection. In particular, the reconnection of the lasers should, in line with the ITU-T G.664 recommendation, be appropriate to a restart phase initiated in automatic mode.

The object is achieved from the methodological viewpoint in a method comprising the features of the claims.

Based upon a method for starting lasers in a network in line with recommendation ITU-T G.664, which preferably initiates a restart phase in automatic mode after an e.g. fault-induced or network-configuration-related laser disconnection, according to the invention, during the restart phase automatic mode switches to a different mode in which a new connection of the lasers takes place faster than in automatic mode. The restart phase in automatic mode provided for the startup as per recommendation ITU-T G.664, page 8, FIG. 3 "Automatic laser shutdown and restart concept including test procedure", which enables a new connection of the lasers after 100 to 300 seconds, is speeded up considerably by switching to a selected different mode with virtually immediate connection of the lasers.

This enables an immediate new connection of the lasers within a few seconds at most. Furthermore, in order to prevent an accident, safety measures are taken before connection of the lasers. To this end, one or more connections for safe transmission of optical signals are switched by means of a network management or by means of a control in the network element. As a rule, such switching procedures last only a few milliseconds, up to a few seconds at most, after which at least all the lasers could, where the connections have been checked accordingly, be reconnected. In automatic mode, however, these lasers remain disconnected over a switching delay period of at least 100 seconds, resulting in an unnecessary loss of time. By switching off automatic mode and selecting a different mode that permits laser connection immediately or within a much shorter period than the switching delay period in automatic mode, this unnecessary delay period is shortened considerably.

It is possible simply to use the manual mode provided in ITU-T G.664 as an alternative mode to automatic mode. A manual activation carried out by an operator can be effected directly by means of the switch of mode from automatic to manual. This eliminates the need to introduce a different standard mode that has not yet been defined in ITU-T G.664.

Advantageous embodiments of the invention are specified in the dependent claims.

BRIEF DESCRIPTION OF THE DRAWINGS

An exemplary embodiment of the invention is explained in detail below with reference to the drawings, in which.

DETAILED DESCRIPTION OF INVENTION

Figure 1:
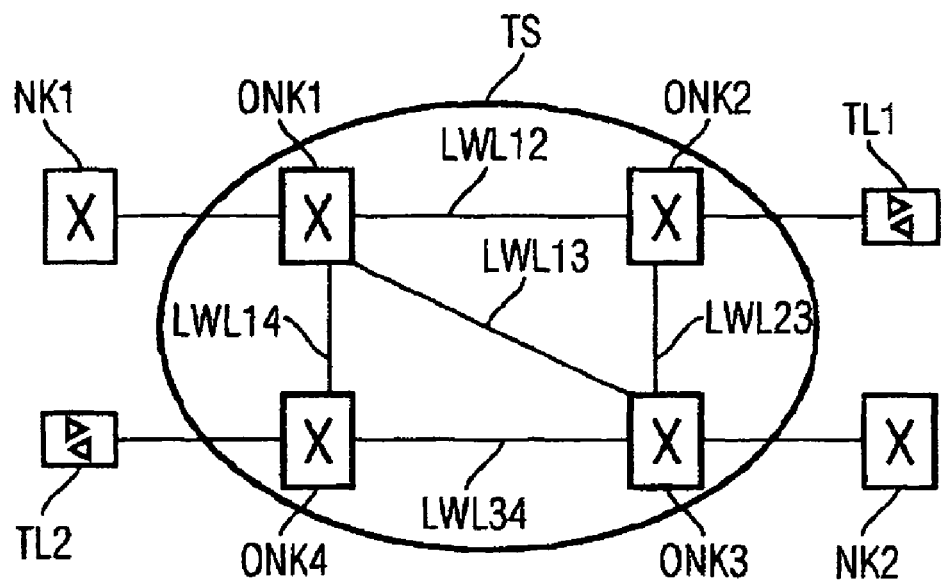
FIG. 1 shows a prior art network for transmitting optical signals in which the disconnection and connection of lasers could be applied as per the manual and automatic modes in accordance with ITU-T G.664.
Figure 2:
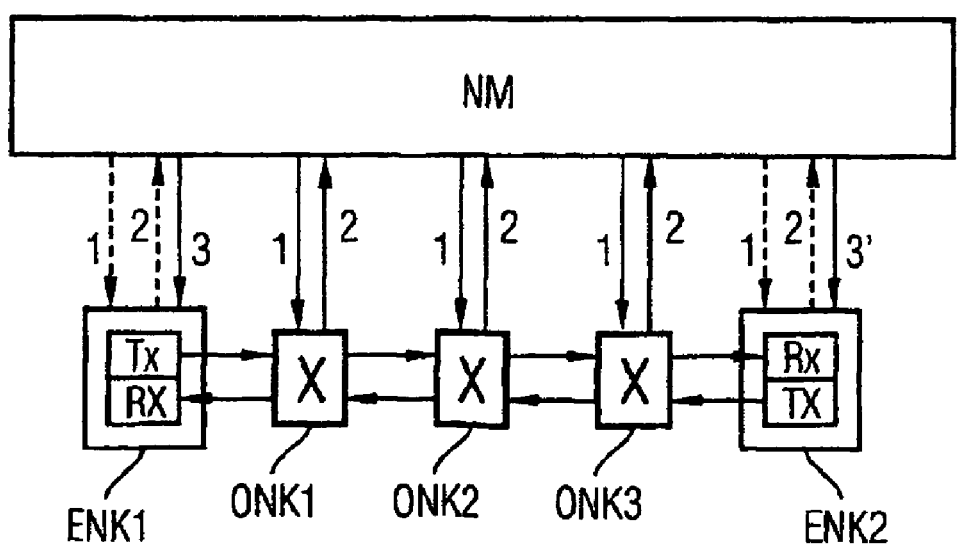
FIG. 2 shows an optical connection with shutdown of automatic mode by means of a network management.

FIG. 2 shows an optical network connection with a shutdown of automatic mode according to the invention by means of a network management. The optical network connection has, serially switched, a transmitter ENK1 (also comprising a receiver where the transmission of signals is bidirectional), one or more further switching nodes ONK1, ONK2, ONK3 (here optical switch elements without optical-electrical conversion) and then a receiver ENK2 (also comprising a transmitter where the transmission of signals is bidirectional). The transmitter and the receiver ENK1, ENK2 have e.g. a laser Tx and a photodiode Rx respectively. The optical network connection can be provided as a multiplex transmission system for transmitting optical WDM or DWDM signals. All the network elements (transmitter, switching nodes, receiver) ENK1, ONK1, ONK2, ONK3, ENK2 are connected to a network management NM, from which a first message 1 is fed to each network element in order to configure the optical network connection. Furthermore, to confirm the correct configuration, a second message 2 is fed from each network element ENK1, ONK1, ONK2, ONK3, ENK2 to the network management. Until then, the system is still governed by automatic mode AM in conformance with ITU-T G.664, i.e. all the lasers Tx are shut down. Now, instead of a residual waiting period for reactivating the lasers Tx, manual mode as per ITU-T G.664 is triggered from the network management NM. This can be effected by means of a third message 3 sent from the network management NM, which message is communicated to the transmitter ENK1 and/or the receiver ENK2.

Figure 3:
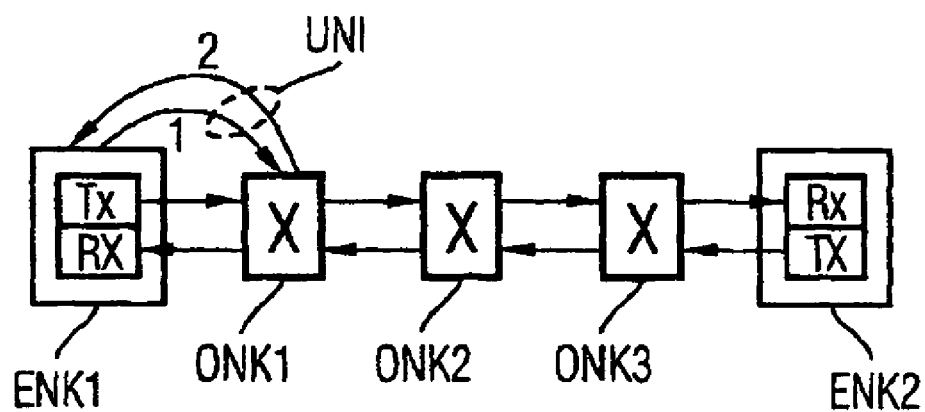
FIG. 3 shows an optical, automatically-switched connection with shutdown of automatic mode by means of a user network interface.

FIG. 3 shows a variant of the switch from automatic mode AM to manual mode MM as shown in FIG. 2, but without the aid of a network management NM. This can be applied in the case of automatically-switched networks in which a user network interface UNI between the transmitter ENK1 and the first downstream switching node ONK1 initiates the configuration of the entire optical network connection ENK1, ONK1, ONK2, ONK3, ENK2 by means of a first message 1 from the transmitter ENK1 and checks said configuration by means of a second return message 2 from the first switching node ONK1. Here, the first message 1 will contain configuration information and transmit it via all the network elements to the receiver ENK2. There, the first message 1 will be sent back, now as a second return message 2, from the receiver ENK2 to the transmitter ENK1. The second return message 2 contains checking information for checking possible faults in the overall optical network. If the configuration of the entire optical network connection ENK1, ONK1, ONK2, ONK3, ENK2 is correct, the switch from automatic mode AM to manual mode MM can be triggered from the transmitter ENK1. That means that the laser Tx in the transmitter ENK1 and, where transmission is bidirectional, a laser Tx in the receiver ENK2 are connected without delay.

Figure 4:
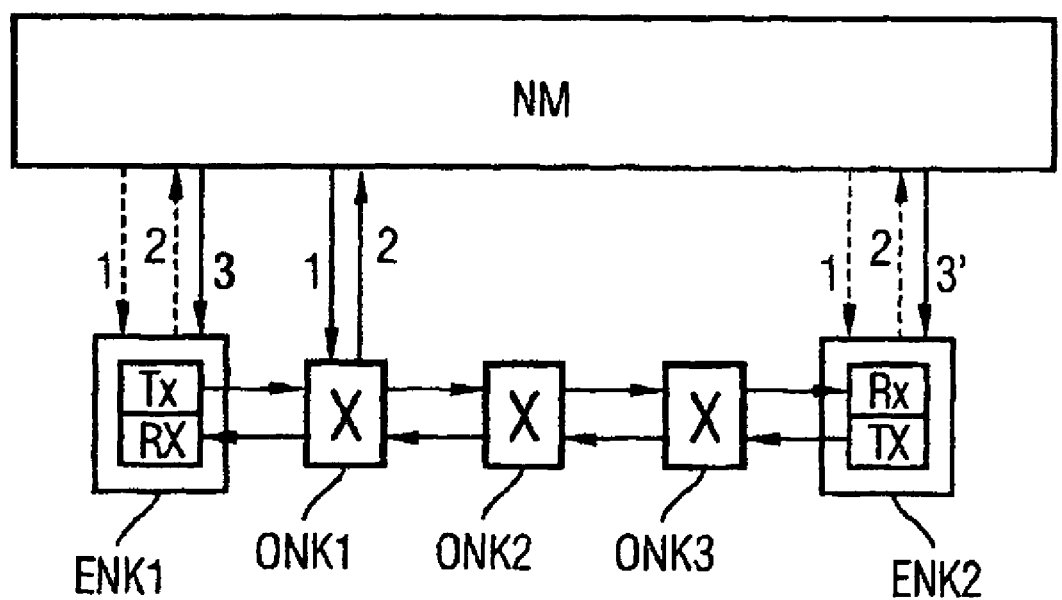
FIG. 4 shows an optical, automatically-switched connection with shutdown of automatic mode without a user network interface.

FIG. 4 shows a further exemplary embodiment according to FIG. 2, in which, in order to initiate the configuration of the entire optical network connection, the network management NM [sic] the first message 1 is communicated to the transmitter ENK1 and to the first switching node ONK1. The transmitter ENK1 and the first switching node ONK1 then each send the second return message 2 to confirm the status of the configuration back to the network management NM in accordance with FIG. 2. Here, no user network interface is needed, since initiation of the configuration of the optical network connection between the transmitter ENK1 and the first downstream switching node ONK1 takes place via the network management NM. Where applicable, the network management NM can also switch a first and a second message 1, 2 in accordance with FIG. 2 to the receiver ENK2. The establishment of the optical network connection between the first optical switching node ONK1 and the downstream network elements is carried out from the first optical switching node ONK1 in accordance with FIG. 3. After confirmation to the network management NM of the second return message 2 in accordance with FIG. 2 and where configuration of the entire optical network connection is transmitted fault-free, the network management NM sends to the transmitter ENK1 and/or to the receiver ENK2 the third message 3 to trigger manual mode MM in accordance with FIG. 2 and thus to connect the lasers.

Figure 5:
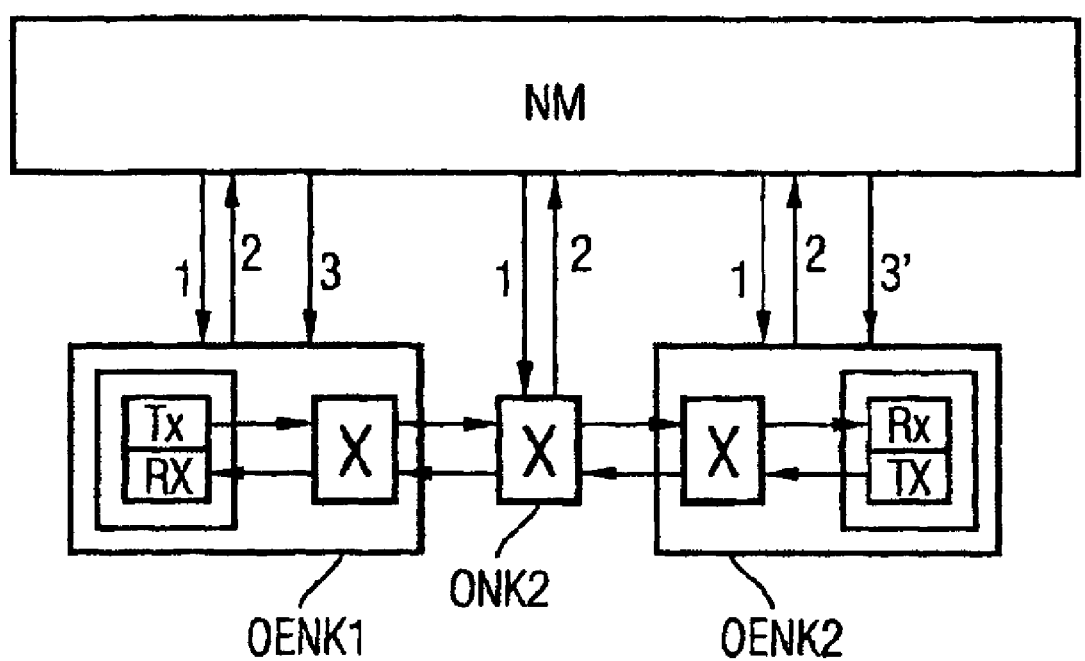
FIG. 5 shows an optical connection comprising hybrid network elements with shutdown of automatic mode by means of a network management.

FIG. 5 shows an optical network connection comprising hybrid network elements in which in accordance with FIG. 2 a shutdown of automatic mode AM is carried out by means of the network management NM. A hybrid network element refers to a network element which can optically emit, switch and receive an optical signal, but which has at least one electrical component such as a transponder or an electrical-optical converter. If the transmitter ENK1 and the first switching node ONK1 from FIG. 2 are combined in a single network element OENK1, then a hybrid network element is produced. The same also applies to the combining of the last switching node ONK3 with the receiver ENK2 into a hybrid network element OENK2. The switch to manual mode MM is triggered in accordance with FIG. 2, 3 or 4, whereby the first and the last network element of the optical network connection are now the hybrid network elements OENK1, OENK2.

The invention claimed is:

1. A method for starting lasers in a communications network comprising a plurality of communications network elements, comprising:
configuring an optical network connection in the network between a first and a second network element during a restart phase of a laser in an automatic mode;
sending a configuration status of the network connection to a control unit; and
automatically triggering a switch from the automatic mode to a manual mode after the control unit receives a correct configuration status, whereby a laser connection takes place faster in manual mode than in the automatic mode.

2. The method according to claim 1, wherein a central network management configures the connection, wherein the status of the network elements is sent to the network management, and wherein the network management triggers the switch from automatic mode to manual mode through a network element of the connection.

3. The method according to claim 2, wherein the first network element includes an optical transmitter and optical receiver, or wherein the first network element is a transponder comprising an optical transmitter and optical receiver, or wherein the first network element is an optical switching node.

4. The method according to claim 2, wherein the second network element includes an optical transmitter and optical receiver, of wherein the second network element is a transponder comprising an optical transmitter and optical receiver, or wherein the second network element is an optical switching node.

5. The method according to claim 1, wherein the first element establishes the connection to the second element via an intermediate network element, and wherein the first network element initiates the switch from the automatic mode to the manual mode after a correct establishment of the optical network connection.

6. The method according to claim 1, further comprising a network management, wherein the first element establishes the connection to the second element via an intermediate network element, wherein the network management configures at least one optical network connection to at least one network element, and wherein status is reported back to the network management, and the network management triggers the switch from automatic mode to manual mode via a network element of the connection.

7. The method according to claim 6, wherein the first network element controls an optical transmitter and an optical receiver via electrical and/or optical switching, or wherein the second network element controls an optical transmitter and an optical receiver via electrical and/or optical switching, or wherein the first and second network elements control optical transmitters and an optical receivers via electrical and/or optical switching.

8. The method according to claim 7, wherein the first network element includes an optical transmitter and optical receiver, or wherein the first network element is a transponder comprising an optical transmitter and optical receiver, or wherein the first network element is an optical switching node.

9. The method according to claim 7, wherein the second network element includes an optical transmitter and optical receiver, or wherein the second network element is a transponder comprising an optical transmitter and optical receiver, or wherein the second network element is an optical switching node.

10. A method for starting lasers in a communications network via a communications network management comprising, comprising:
configuring a communications optical network connection in the network by sending a configuration message to a communications network element during a restart phase of a laser in an automatic mode;
receiving a configuration status of the network connection from the network element;
automatically triggering a switch from the automatic mode to a manual mode, whereby a laser connection takes place faster in manual mode than when in the automatic mode.

11. The method according to claim 10, wherein the trigger is a message sent from the network management to the network element.

12. The method according to claim 11, wherein the network element includes and optical receiver and an optical transmitter.

13. The method according to claim 12, wherein the network element further includes an electrical component.

14. The method according to claim 13, wherein the electrical component is a transponder or an electrical-optical converter.

* * * * *